(12) United States Patent
Guillemette

(10) Patent No.: US 6,533,565 B1
(45) Date of Patent: Mar. 18, 2003

(54) METHOD AND APPARATUS FOR DISTRIBUTING MATERIAL IN A PROFILE EXTRUSION DIE

(76) Inventor: A Roger Guillemette, 10 Pike St., West Warwick, RI (US) 02893

( * ) Notice: Subject to any disclaimer, the term of this patent is extended or adjusted under 35 U.S.C. 154(b) by 0 days.

(21) Appl. No.: 09/546,487

(22) Filed: Apr. 10, 2000

(51) Int. Cl.[7] ................................................ B29C 47/12
(52) U.S. Cl. .................... 425/113; 425/131.1; 425/461; 425/465
(58) Field of Search ........................... 425/131.1, 382.4, 425/380, 113, 461, 465, 466, 464; 264/167; 29/705, 284

(56) References Cited

U.S. PATENT DOCUMENTS

| | | | | | |
|---|---|---|---|---|---|
| 4,187,068 A | * | 2/1980 | Vassar | ........................ | 425/381 |
| 4,405,547 A | * | 9/1983 | Koch et al. | ............. | 264/173.16 |
| 4,846,658 A | * | 7/1989 | McMullen | ................ | 264/209.1 |
| 4,960,375 A | * | 10/1990 | Saito et al. | .................. | 264/167 |
| 5,197,514 A | * | 3/1993 | Jaun | ............................ | 137/597 |
| 5,219,588 A | * | 6/1993 | England et al. | ........... | 264/177.1 |
| 5,500,173 A | * | 3/1996 | Dugan | .................... | 264/173.18 |

* cited by examiner

Primary Examiner—Mark Eashoo
(74) Attorney, Agent, or Firm—Perman & Green, LLP

(57) ABSTRACT

A method and apparatus for extruding plastic products having complex cross sections, which require a complex die cross section, is described in which the cross section of the die is divided into regions of critical flow and separate flow streams are supplied to each region in proportion to the relative size of the region to the overall die cross section.

10 Claims, 2 Drawing Sheets

METHOD AND APPARATUS FOR DISTRIBUTING MATERIAL IN A PROFILE EXTRUSION DIE

BACKGROUND OF THE INVENTION

In the field of extruding complex shapes one of the more challenging items to produce is the flexible gaskets used for sealing refrigerators, automobile doors, hatches, and the like. These products utilize a complex cross section which requires considerable dexterity for the die to accurately reproduce the product. In order to accurately extrude these shapes, the die must completely fill while maintaining a continuous flow of plastic. The dies used in this type of process are generally referred to as profile dies. In manufacturing such dies it is often necessary to construct the die, use the die to see how it works and then, through a series of corrections, gradually bring the die into tolerance. This trial and error method is time consuming and expensive.

It is a purpose of this invention to construct a profile die which provides a balanced flow to the extremities of the die passage and to provide a more accurate and simpler way to construct a profile die within closer tolerances. A die with close tolerances will allow the product to be extruded with less material with a resulting savings in cost.

SUMMARY OF THE INVENTION

A profile die system is constructed for extruding a flexible product having a complex cross section. The die system of this invention consists of an assembly of axially aligned generally cylindrical modules. A series of passages are provided to deliver molten plastic from the input to the die in a balanced flow. To accomplish this a distribution module is constructed with an inlet to receive plastic from an extruder. The distribution module has a plurality of distribution channels extending downstream in the die system. The distribution channels are sized and positioned to supply selected regions of the extrusion passage. The distribution channels exit at the downstream face of the distribution module. A transition module is positioned downstream of the distribution module and is constructed with a series of transition passages extending from its upstream to its downstream face. In the assembled position, the inlets of the transition passages are aligned with the exits of the distribution channels to receive molten plastic therefrom. The cross section of the transition passages gradually converts a generally cylindrical flow to a cross sectional shape representative of the region of the die selected for the particular passage.

In constructing the distribution channels, it is first necessary to analyze the shape of the extrusion passage and divide its cross sectional area into regions for concentration of plastic according to the nuances of its shape. The number of distribution channels is determined by the number of regions selected. The cross sectional area of each of the distribution channels is designed to be less than the cross section of the profile die system inlet and consistent with the flow area of the region serviced by the channel. In this manner the overall flow volume from the extruder is metered proportionally into the selected regions. Each of the transition passages are constructed to have a reduced cross sectional area from that of the distribution channel with which it communicates. Therefore, the flow volumes in each of the regional flow streams is gradually reduced from the inlet of the distribution module to the extrusion die, thereby creating an overall funnel effect in each of the regional streams. In the transition module the passage is constructed to convert the generally cylindrical flow to a shaped flow more compatible with the entrance to the die passage in each of the selected regions.

DESCRIPTION OF THE DRAWING

The preferred embodiment of the invention is described in more detail below with reference to the drawing in which.

DETAILED DESCRIPTION OF THE INVENTION

Figure 1A:
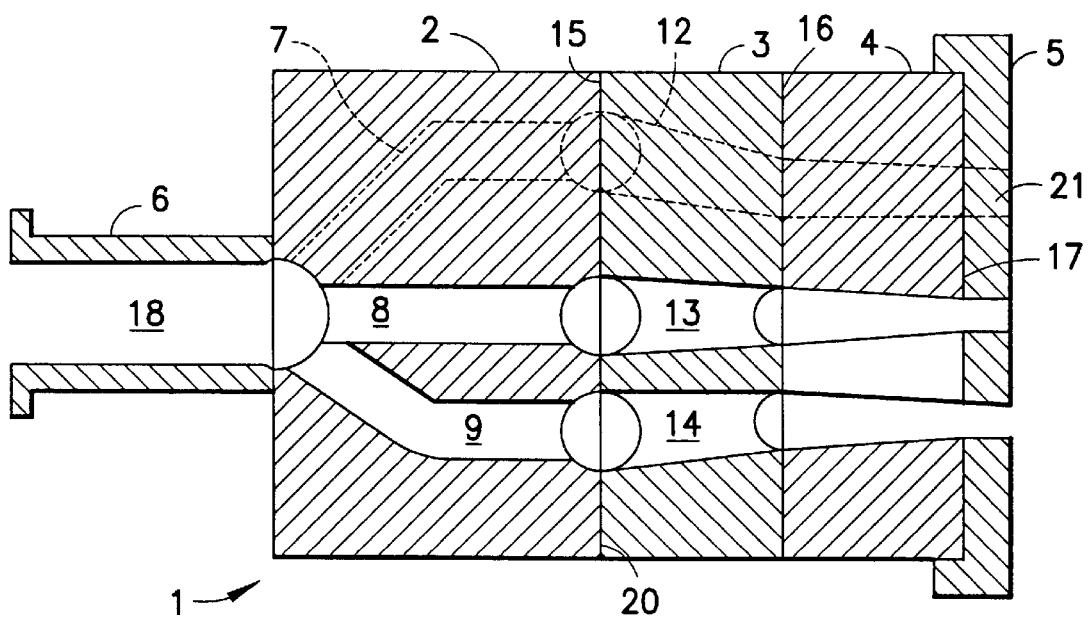
FIG. 1a is a cross sectional view of the profile die system of this invention.
Figure 1B:
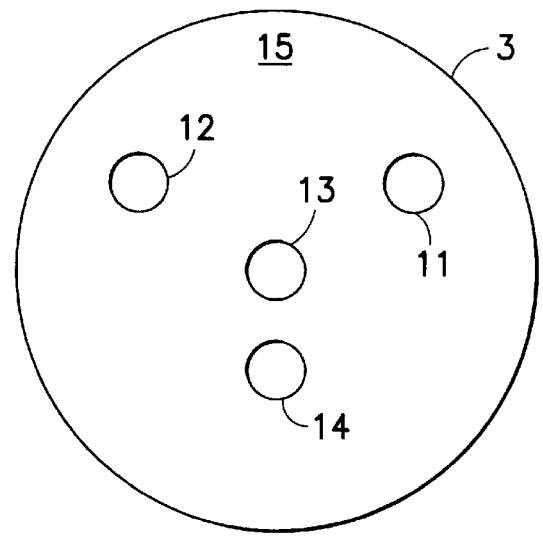
FIG. 1b is an end view of the upstream face of the transition module of this invention.
Figure 1C:
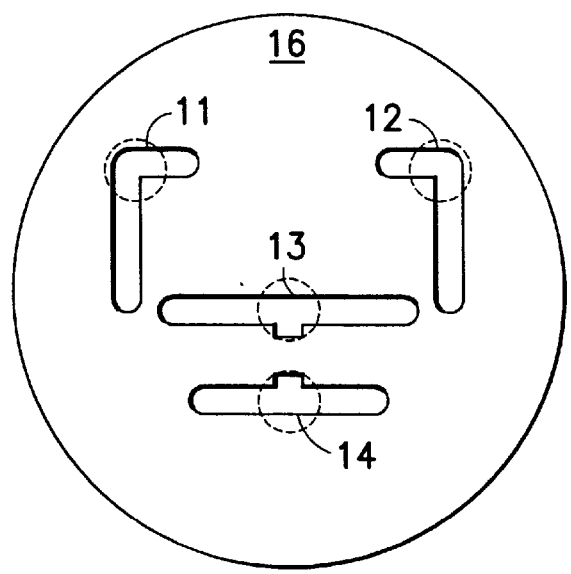
FIG. 1c is an end view of the downstream face of the transition module of this invention.
Figure 1D:
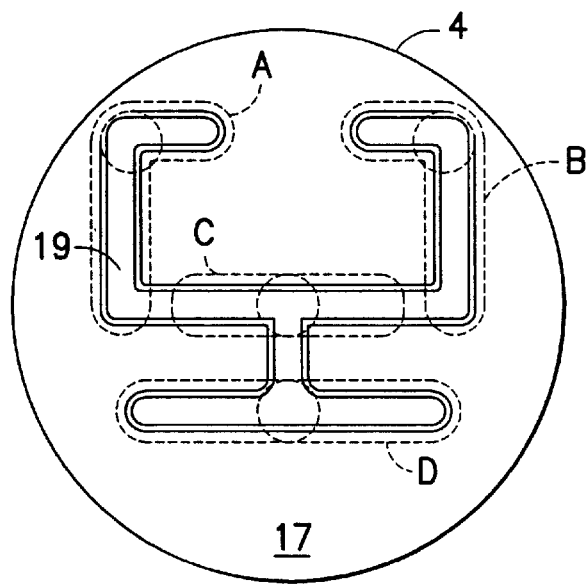
FIG. 1d is an end view of the upstream face of the die module of this invention.

As shown in FIG. 1a, a profile extrusion die system 1 is constructed having a distribution module 2, a transition module 3 and a die module 4. An die plate 5 retains the modules in the assembled condition and provides a straight exit 21 for the flowing plastic from the die module 4. Inlet flange 6 is shown integral with the distribution module 2 and encloses inlet 11 to the profile die system 1. The inlet flange 6 is constructed to connect to the extruder which supplies the plasticized material to the profile die system 1 for extrusion into a complex shape as illustrated in FIG. 1d.

A series of distribution channels 7, 8, 9, and 10 (not shown) are constructed by electric discharge machining or other means within the distribution module 2. The number and size of the distribution channels are selected relative to the complexity of the die. The cross sectional area of each of the distribution channels 7–10 is less than the cross sectional area of the inlet. In the example shown, four distribution channels are selected to meter the flowing plastic into four regional flow streams having volumes relative to regional portions of the extrusion passage 19. Each of the distribution channels exit at the downstream face 20 of the distribution module 2.

A transition module 3 is assembled adjacent to the downstream face 20 of the distribution module 2. Transition passages 11 through 14, as shown in FIG. 1b, are constructed by electric discharge machining or other means. The passages 11–14 extend from entrances in upstream face 15 (FIG. 1b) of the transition module 3 to exits in the downstream face 16 (FIG. 1c) in module 3. In the assembled position, the entrances of the transition passages 11–14 align with the exits of the distribution channels 7–10 respectively to receive flowing material.

Consistent with the overall flow strategy of the profile die system of this invention, the flow area of each of the transition passages is reduced relative to the flow area of each of the distribution channels to which it is connected. In addition the cross section of the transition passage changes over its length to convert the flow from generally cylindrical to a shaped flow consistent with the shape of the selected region of the die cross section. The exits of the passages 11–14 are shown in FIG. 1c.

To accomplish the balanced flow, the shape of the cross sectional shape of die passage 19 is analyzed and accordingly divided into a plurality of regions, for example; A, B, C, and D shown in FIG. 1d. Each region is selected to coincide with areas of possible distribution difficulties where complete filling of the die is critical. The filling of the die throughout its volume must be accomplished with constant velocity and flow. After the regions are selected, the percentage of flow volume for each region is calculated and related back to the size of the distribution channel which supplies the particular region.

For illustration purposes, the cross section of extrusion passage 19, may be divided into regions A, B, C, D as shown by dotted lines in FIG. 1d. In order to determine the proportional flow area of the channels 7–10, the ratio of the area of the region supplied by a channel, i.e. channel 7 supplies A, channel 8 supplies C, etc., to the overall area of the die profile is determined. The channel is sized to accommodate a flow stream consistent with the requirements of the related region.

To insure an overall uniform flow at a consistent velocity, the regional flow paths constructed by the assembly of distribution channels 7–10, transition passages 11–14, and extrusion passage 19 are designed for a funnel effect. This is accomplished by reducing the cross sectional areas of adjoining portions of the flow path from the upstream to the downstream ends of the regional flow paths. This assists in maintaining a constant velocity of the flow. The gradual increase in pressure which arises within the funnel shaped flow paths forces the molten material into the most remote section of the die.

The embodiment shown is for illustration purposes only, as the possible die shapes are infinitely variable. In each instance, depending on the cross section of the product, a specific flow path must be designed. In very complex dies it may be necessary to use multiple transition modules. Where necessary, bushings may be used to throttle the flow from the distribution module to the transition module as a means of adjusting flow to balance or correct for manufacturing inaccuracies.

In addition for special applications involving the extrusion of multiple materials, it may necessary to provide separate inlets and distribution channels to individual regions. A particular region would be supplied separately and maintained as an independent channel from the inlet to its outlet in order to extrude a product having components of different materials. This could be accomplished in a common or independent distribution module. In some instances a transition module for one component could be used as the distribution module for another component. The extruded components would be joined and welded together in the final product. In this manner extruded assemblies having two or more components of different materials can be processed in the same profile die assembly.

I claim:

1. A die system for extruding plastic products, said plastic flowing through a passage constructed in a series of assembled modules and extending from upstream inlet to a downstream outlet, said products being formed in accordance with the cross section of the outlet of the system, said die system comprising:

selected regions of said outlet cross section having predetermined flow concentration requirements;

a distribution module having an inlet for receiving flowing plastic and a plurality of distribution channels for receiving a divided portion of said flowing plastic, each of said distribution channels constructed to supply one of said selected regions with said portion of the plastic flow;

a transition module having a plurality of transition channels constructed therein to form a portion of the die system passage, each of said transition channels communicating with one of said distribution channels to receive flowing plastic therefrom, said transition channels constructed having a cross section which varies, from a first cross section, shaped to facilitate communication with said distribution channel, to a second cross section, shaped substantially in the form of one of said selected regions of said die system outlet cross section;

a die module having an extrusion passage constructed therein to form a portion of the die system passage to receive flowing plastic from said transition channels and to extrude said plastic through its outlet to form the extruded product; and wherein said plastic flow in each of the distribution channels is determined by the ratio of the cross sectional area of the selected region supplied thereby, to the overall cross sectional area of the die system outlet.

2. A die system for extruding plastic products, said plastic flowing through a passage constructed in a series of assembled modules and extending from upstream inlet to a downstream outlet, said products being formed in accordance with the cross section of the outlet of the system, as described in claim 1, wherein the communication between a distribution channel and a transition channel form a regional flow stream, and wherein at least one of said regional flow streams is independently supplied with a different material for forming an individual component of the extruded plastic product.

3. A die system for extruding plastic products, said plastic flowing through a passage constructed in a series of assembled modules and extending from upstream inlet to a downstream outlet, said products being formed in accordance with the cross section of the outlet of the system, as described in claim 1, wherein communication between a distribution channel and a transition channel form a regional flow stream, and where each of the portions of the die system passage is constructed having a smaller cross section than the immediately upstream portion to create a funnel effect within each of the regional flow streams formed thereby.

4. A die system for extruding plastic products, said plastic flowing through a passage constructed in a series of assembled modules and extending from upstream inlet to a downstream outlet, said products being formed in accordance with the cross section of the outlet of the system, as described in claim 1, further comprising multiple transition modules in which the shape of the transition channel is varied in steps.

5. In an extrusion die system for extruding a plastic product, a passage extending from an upstream inlet to a downstream outlet, said passage comprising:

a die having a passage constructed therein to provide said downstream outlet, said downstream outlet having a cross sectional profile which is divided into preselected regions, a series of distribution channels, each channel designed to supply a regional plastic flow according to the volume required in at least one of said preselected regions of said cross sectional profile; and a series of transition channels communicating with said distribution channels, and designed to convert the cross sectional shape of the regional plastic flow from the cross sectional shape of the distribution channel to the cross sectional shape of the preselected region.

6. In an extrusion die system for extruding a plastic product, a passage extending from an upstream inlet to a downstream outlet, said downstream outlet having a cross sectional profile which is divided into preselected regions, said profile consistent with the cross section of the extruded product, said passage, as described in claim 5 wherein at least one of said regional flow streams is independently supplied with a different material for forming an individual component of the extruded plastic product.

7. In an extrusion die system for extruding a plastic product, a passage extending from an upstream inlet to a downstream outlet, said downstream outlet having a cross sectional profile which is divided into preselected regions, said profile consistent with the cross section of the extruded product, said passage, as described in claim 5 wherein each of the connected distribution and transition channels is constructed having a smaller cross section than the immediately upstream channel to create a funnel effect within each of the regional flow streams formed thereby.

8. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system comprising the steps of:

analyzing said cross sectional profile to identify regions having critical flow requirements;

dividing the area of the cross sectional profile into said critical regions for the purpose of concentrating the supply of plastic;

calculating a ratio for each of said regional areas equal to the regional area divided by the total area of said cross sectional profile;

constructing a first module for dividing the flow of plastic into multiple supply channels for supplying a flow volume to a critical region in proportion to the ratio calculated for said region;

constructing a second module for converting the cross sectional shape of said supply channels to the cross sectional shape of said critical regions;

constructing a die module for forming the downstream outlet of the extrusion die system; and interconnecting said modules to supply the plastic flow to the outlet in alignment with the critical regions.

9. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system, as described in claim 8, wherein at least one of said regional flow streams is independently supplied with a different material for forming an individual component of the extruded plastic product.

10. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system, as described in claim 8, wherein each of the supply channels is constructed having a smaller cross section than the immediately upstream channel to create a funnel effect within each of the regional flow streams formed thereby.

* * * * *